United States Patent [19]

Nishihara et al.

[11] Patent Number: 4,652,738
[45] Date of Patent: Mar. 24, 1987

[54] EDGE DETECTING DEVICE IN OPTICAL MEASURING INSTRUMENT

[75] Inventors: Sadamitsu Nishihara, Hino; Katsuhide Sawada, Kawasaki, both of Japan

[73] Assignee: Mitutoyo Mfg. Co., Ltd., Tokyo, Japan

[21] Appl. No.: 779,508

[22] Filed: Sep. 24, 1985

[30] Foreign Application Priority Data

Sep. 25, 1984 [JP] Japan ............................... 59-199876

[51] Int. Cl.[4] .......................... G05B 1/02; G05B 19/33
[52] U.S. Cl. ..................................... 250/202; 318/577
[58] Field of Search .................. 250/202, 548, 203 R, 250/206, 559, 560, 561, 208, 209, 211 R; 318/577; 356/121, 372, 375, 384–387

[56] References Cited

U.S. PATENT DOCUMENTS 4,557,602 12/1985 Ueda .................................... 356/372

Primary Examiner—Eugene R. LaRoche
Assistant Examiner—David Mis
Attorney, Agent, or Firm—Parkhurst & Oliff

[57] ABSTRACT

An edge detecting device in an optical measuring instrument for detecting a transmitted or a reflected light to directly or indirectly measure a dimension of an object to be measured is disclosed. The edge detecting device comprises A sensor including two light receiving elements disposed coaxially with each other and the two light receiving elements so as to produce phase shift signals in response to a bright or a dark portion during the relative movement. Levels of sensor output signals appearing at sensor output terminals in response to outputs of the light receiving elements become equal in value to each other each time the bright or dark portion is generated during the relative movement.

A difference calculator is connected to the sensor output terminals, for calculating a difference between the phase shift signals;

A region signal generator making at least one output signal taken out of a signal processing system extending from the output side of the sensor to the input side of the difference calculator into an input signal, is provided for outputting a signal in a specific region including a cross point with a reference level signal of the phase shift signals. Sensing means for outputting a cross signal between an output signal from the difference calculator and a preset reference level signal while the region signal genertor outputs the signal is also provided.

18 Claims, 6 Drawing Figures (A)

(B)

(C)

(D)

(E)

EDGE DETECTING DEVICE IN OPTICAL MEASURING INSTRUMENT

BACKGROUND OF THE INVENTION

1. Field of the Invention

This invention relates to an edge detecting device in an optical measuring instrument for measuring a dimension, a displacement value and the like of an object, and more particularly to an edge detecting device in an optical measuring instrument, wherein the object to be measured, which is not transparent, is directly irradiated by a scanning light, a transmitted light or a reflected light generated due to this irradiation, or a projected image of an object to be measured, generated due to the transmitted light or reflected light is received by a photo-electric element or elements to take out an electric signal or signals, and the measurement of a dimension, discrimination of a position, judgment of a configuration or the like of the object to be measured is performed in response to the aforesaid electric signal or signals.

2. Description of the Prior Art

The optical measuring instrument of the type described, such for example as a projector, has heretofore been of such an arrangement that an object to be measured on a mount is irradiated by a parallel light, a projected image of the object to be measured is made to focus on a screen in response to a transmitted light or a reflected light thereof, and a dimension, configuration or the like of the object to be measured is measured from the formed image. However, an edge of the image of the object to be measured, projected on the screen has a so-called bleading, in general. In consequence, it is difficult for the object to be measured to be accurately read in through a coincidence between the image formed on the screen and a hair line.

To obviate the above-described disadvantages, there has been proposed such a method that the edge of the formed image is moved relative to a photo-electric element, whereby a variation in value of an electric signal outputted from the photo-electric element due to a variation in a ratio between areas of a bright portion and a dark portion of the image projected on a light receiving surface of the photo-electric element is compared with a reference voltage, so that the edge of the projected image can be detected.

However, this method presents such disadvantages that the adverse influence by noises of lights of disturbance and the like is great and the measuring accuracy is lowered to a considerable extent by fluctuations in the signal obtained from the photo-electric element or the reference voltage.

Further, there is another method, wherein the photo-electric element is moved relative to the boundary (edge) of the image projected on the screen, an output signal at this time is subjected to the second order differentiation to obtain a wave form signal, whereby this wave form signal is compared with a reference voltage to thereby detect the edge. However, there are such disadvantages that positions of the edge detected are different depending upon the speeds of the relative movement between the photo-electric element and the projected image, and further, the measuring accuracy is lowered to a considerable extent by fluctuations in the reference voltage.

Further, there are provided two photo-electric elements, which are moved relative to the edge of the projected image, and a wave form signal is obtained from a plurality of output signals obtained by the aforesaid relative movement, whereby the wave form signal is compared with a reference voltage to thereby detect the edge. However, similarly to the above, there are presented such disadvantages that, due to a relative variation between the output signals and the reference voltage, fluctuations in level and the like, the measuring becomes highly unstable. Further, the scope of application for the intensity of illumination of the irradiating light is narrow, the made of measuring is restricted, and a sensor section or a circuit portion becomes complicated in construction.

Particularly, in the projector, the brightness of the image projected on the screen is changed due to the fatigue of a power source lamp for irradiation, the characteristics of lenses in a projection system and lights of disturbance, the brightness of the projected image is changed due to the switching of magnifications, and further, as a condition on the part of a measurer, since the brightness suitable to the operation is varied depending on the color of pupils of the measurer (varying with races) for example, the suitable brightness should be selected. As the result, the narrow scope of application for the intensity of illumination of the irradiating light as described above leads to lowered capacity of the projector.

Furthermore, according to the conventional method of detecting the edge, when the focus of the projected image is shifted, a wave form outputted by the photo-electric element becomes gentle, thus presenting the disadvantage of being incapable of accurately detecting the edge.

This disadvantage is not only of the projector but also common to the edge detections by the optical measuring instruments, wherein, in general, the transmitted light or reflected light is detected, whereby dimensions and the like of the object to be measured are directly or indirectly measured.

As against the above, as disclosed in Japanese Patent Kokai (Laid-open) No. 173408/83 for example, there is provided an edge detecting device in an optical measuring instrument wherein a transmitted light or a reflected light is detected to directly or indirectly measure a dimension of an object to be measured, comprising;

a sensor including four light receiving elements for producing at least two sets of phase shift signals in response to a bright portion or a dark portion which is generated at the time of relative movement with the object to be measured;

first and second calculating means for calculating differences between the phase shift signals of the respective sets;

a third calculating means for calculating a difference between signals outputted form the first and the second calculating means, and a fourth calculating means for calculating a sum between the signals outputted from the first and the second calculating means; and sensing means for outputting a cross signal between a reference level signal and a signal outputted from the third calculating means, which is produced while a signal outputted from the fourth calculating means is on a predetermined level.

This edge detecting device can offer such advantages that the edge can be detected with a simplified construction and without the adverse influence due to the strength of the light irradiating the object to be measured, noises of the lights of disturbance and the like during measuring and fluctuations in the signals outputted from the photo-electric elements or in the reference voltage, the edge can be accurately detected even when there is a shift in focus of the projected image, and further, the edge of the object to be measured can be detected by directly processing an analogue signal from a photo-electric signal.

However, the edge detecting device disclosed in Japanese Patent Kokai (Laid-Open) No. 173408/83, having a sensor including four light receiving elements arranged in a shape of may not detect the edge of the projected image, in the case of a movement relative to an image on the screen in a projector for example, if the border line of the light receiving elements coincides with the direction of the movement. In consequence, such a disadvantage is presented that the direction of movement of the sensor relative to the projected image is restricted.

SUMMARY OF THE INVENTION

It is therefore the primary object of this invention to provide an edge detecting device in an optical measuring instrument, wherein the movement of the sensor relative to the projected image is not restricted and the edge can be reliably detected in all directions.

To this end, the present invention contemplates that, in an edge detecting device in an optical measuring instrument, wherein a transmitted light or a reflected light is detected to directly or indirectly measure a dimension of an object to be measured, the edge detecting device comprises:

a sensor including two light receiving elements disposed concentrically with each other on a plane substantially parallel to a plane of a relative movement between the object to be measured and the two light receiving elements so as to produce phase shift signals in response to a bright or a dark portion during the relative movement, wherein levels of sensor output signals appearing at sensor output terminals in response to outputs of the light receiving elements become equal in value to each other each time the bright or dark portion is generated during the relative movement;

a difference calculator connected to the sensor output terminals, for calculating a difference between the phase shift signals;

a region signal generator making one of the sensor output signals into an input signal, for outputting a signal in a specific region including a cross point with a reference level signal of the phase shift signals; and sensing means for outputting a cross signal between an output signal from the difference calculator and a preset reference level signal while the region signal generator outputs the signal.

To the above end, the present invention contemplates that the outer peripheries of the two light receiving elements are formed into circular shapes and light receiving areas thereof are made equal to each other.

To the above end, the present invention contemplates that one of the light receiving elements is formed into a circular shape in cross section, the other of the light receiving elements is formed into a ring shape concentric with the one, disposed therearound and radially spaced apart therefrom, and light receiving areas thereof are made equal to each other.

To the above end, the present invention contemplates that the sensor includes a preamplifier disposed between one of the two light receiving elements and one of the sensor output terminals, opposed thereto, whereby output signal levels of the two light receiving elements against received light quantities being equal to each other are made equal to each other at sensor output terminals opposed thereto.

To the above end, the present invention contemplates that the region signal generator includes a window comparator for comparing one of the sensor output signals with a reference signal to produce a region signal when the level of the one of the signals is within a predetermined range.

To the above end, the present invention contemplates that the region signal comparator comprises;

a first comparator for comparing one of the sensor output signals with a first reference signal to output a signal when the one of the signals is lower in value than the first reference signal;

a second comparator for comparing the one of the signals with a second reference signal to output a signal when the one of the signals is lower in value than the second referene signal; and an exclusive OR gate for producing a region signal when only one of the first and the second comparators outputs a signal.

In this invention, a pair of light receiving elements constituting a sensor are arranged concentrically with each other, whereby the border line of the light receiving elements does not coincide with the moving direction of the object to be measured, so that the edge can be reliably detected regardless of the direction of the relative movement between the sensor and the object to be measured.

DETAILED DESCRIPTION OF THE PREFERRED EMBODIMENT

Figure 1:
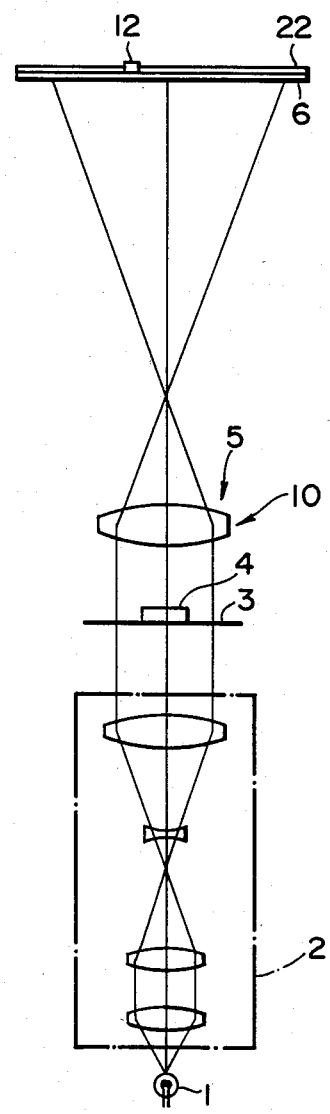
FIG. 1 is an optical system chart showing an embodiment when the edge detecting device in an optical measuring instrument according to the present invention is applied to a projector.
Figure 2:
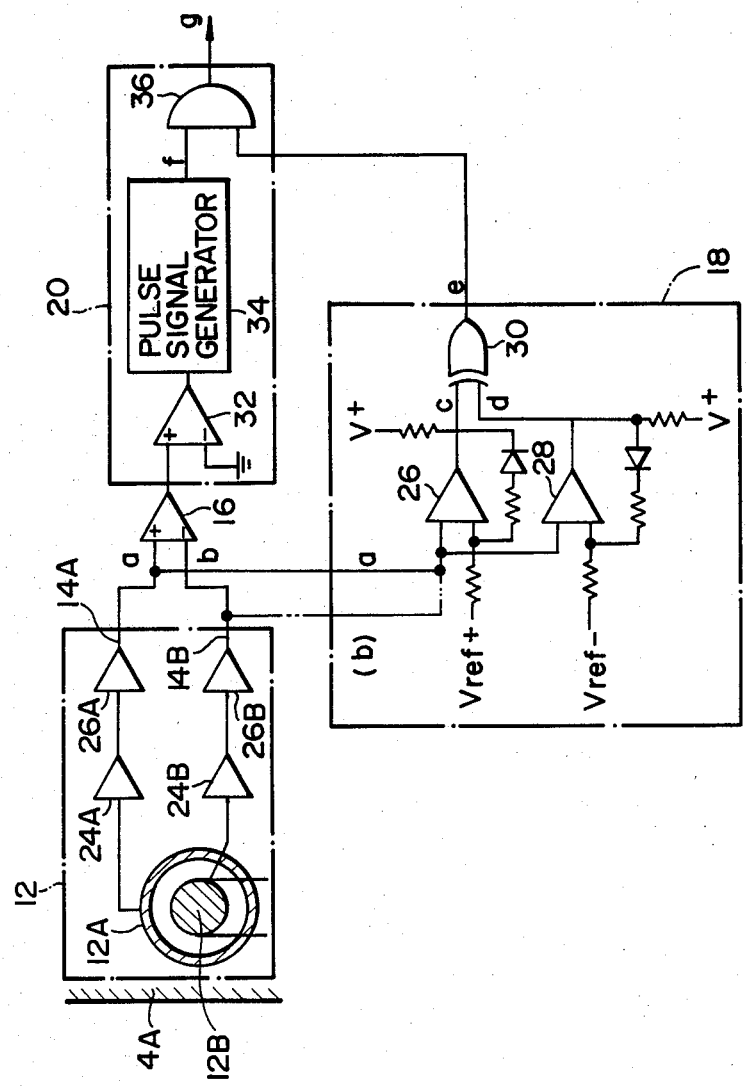
FIG. 2 is a block diagram showing the arrangement of the above embodiment.
Figure 3:
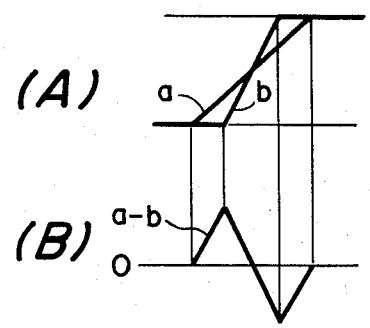
FIG. 3 is a chart showing the signal processing in the above embodiment.
Figure 3:
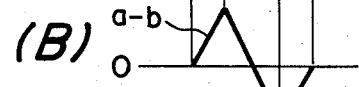
Figure 3:
Figure 3:
Figure 3:
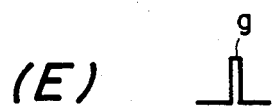

Description will hereunder be given of embodiments of the present invention with reference to the drawings.

In this embodiment, the present invention is applied to a projector. As shown in FIGS. 1 to 4, according to this embodiment, in an edge detecting device in a projector 10, wherein a light from a light source lamp 1 irradiates an object 4 to be measured on a mount 3 from below the mount 3 through condenser lenses 2 or from above the mount 3 through another light path, whereby a projected image of the object 4 to be measured is made to focus on a screen 6 through a projector lens 5 in response to the transmitted light or the reflected light, so that a dimension or the like of the object 4 to be measured can be indirectly measured, the device comprises;

a sensor 12 including two light receiving elements 12A and 12B disposed concentrically with each other on a plane substantially parallel to a moving plane of a relative movement between the object 4 to be measured and the two light receiving elements 12A and 12B so as to produce phase shift signals in response to a bright or a dark portion during the relative movement, wherein levels of sensor output signals appearing at sensor output terminals 14A and 14B in response to outputs of the light receiving elements 12A and 12B become equal in value to each other each time the bright or dark portion is generated during the relative movement;

a difference calculator 16 connected to the sensor output terminals 14A and 14B, for calculating a difference between the phase shift signals;

a region signal generator 18 making one of the output signals of the sensor 12 into an input signal, for outputting a signal in a specific region including a cross point with a reference level signal of the phase shift signals; and sensing means 20 for outputting a cross signal between an output signal from the difference calculator 16 and a preset level signal while the region signal generator 18 outputs the signal.

As shown in FIG. 1, the sensor 12 is integrally provided with a transparent plate 22 mounted slidably on and in parrallel to the top surface of the screen 6 of the projector 10 and made movable with the transparent plate 22.

The light receiving element 12B partially constituting the sensor 12 is formed into a circular shape in cross section, and the light receiving element 12A is formed into a ring shape concentric with the light receiving element 12B, disposed therearound and radially spaced apart therefrom.

Here, in addition to the light receiving elements 12A and 12B, the sensor 12 is provided with current voltage transducers 24A and 24B for current-voltage-transducing outputs from the light receiving elements 12A and 12B and also provided with amplifiers 26A and 26B for amplifying these output voltages.

These amplifiers 26A and 26B are offset-controlled to cancel the dark voltage of the light receiving elements 12A and 12B at the overall darkness and gain-controlled at the overall brightness such that outputs at the sensor output terminals 14A and 14B are on the same level.

The region signal generator 18 comprises;

a first comparator 26 for comparing one a(b) of the sensor output signals with a first reference signal Vref+ to output a signal when the one a of the signals is lower in value than the first reference signal Vref+;

a second comparator 28 for comparing the one of the sensor output signals with a second reference signal Vref— to output a signal when the one of the signals is lower in value than the second reference value Vref—; and an exclusive OR gate 30 for producing a region signal when one of the first and the second comparators 26 and 28 outputs a signal.

Furthermore, the sensing means 20 comprises;

a comparator 32 for outputting a signal when the output signal from the difference calculator 16 and the reference level signal and the both signals coincide with each other, i.e. at the cross point;

a pulse signal generator 34 for producing an edge pulse signal in response to a signal outputted from the comparator 32; and an AND gate 36 for outputting an edge detecting signal only when signals are outputted from both the pulse signal generator 34 and the region signal generator 18.

Description will hereunder be given of the operation of the above embodiment.

The sensor 12 is moved in one direction relative to a projected image 4A of the object 4 to be measured, which is made to focus on the screen 6, whereby the edge of the projected image 4A is made to cross the sensor 12.

When the projected image 4A relatively approaches the sensor 12 and crosses it, output signals obtained by the light receiving elements 12A and 12B, passed through the current-voltage transducers 24A and 24B, regulated by the amplifiers 26A and 26B and produced from the sensor output terminals 14A and 14B become phase shift signals being equal in amplitude to each other as indicated by reference characters a and b in FIG. 3(A). As shown in FIG. 3(B), these output signals are calculated into a-b and outputted by the difference calculator 16.

The signal outputted by the difference calculator 16 is inputted to the comparator 32 of the sensing means 20, and this comparator 32 outputs a digital signal of 1 when an output signal a-b crosses a reference level signal of 0 as shown in FIG. 3(B).

The pulse signal generator 34 outputs a pulse signal f shown in FIG. 3(C) to the AND gate 36 in response to the output from the comparator 32.

On the other hand, the output signal a from the sensor output terminal 14A is inputted to the comparators 26 and 28 of the region signal generator 18, respectively.

Figure 4:
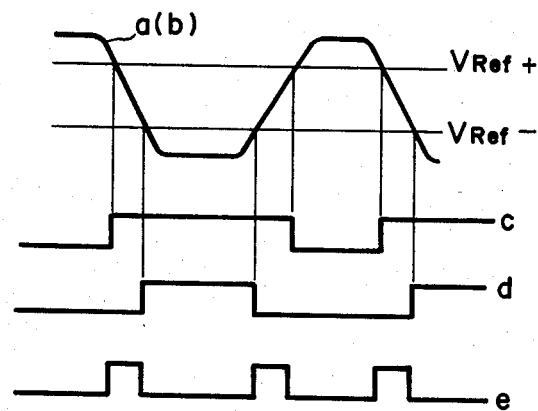
FIG. 4 is a chart showing the process of the signal processing in the region signal generator in the above embodiment.

As shown in FIG. 4, the first comparator 26 outputs a signal to the excludive OR gate 30 when the reference voltage Vref+ and the input signal a are compared with each other and the signal a is lower in value than the reference voltage Vref+. Furthermore, the second comparator 28 outputs a signal to the exclusive OR gate 30 when the reference voltage Vref— and the input signal a are compared with each other and the signal a is lower in value than the reference voltage Vref—.

The exclusive OR gate 30 outputs a digital signal e of 1 while only one of the first and the second comparators 26 and 28 outputs a signal as shown in FIGS. 3(D) and 4.

The pulse signal f from the pulse signal generator 34 and a digital signal e from the exclusive OR gate 30 are inputted to an AND gate 36, where the AND gate 36 outputs a pulse signal g of 10 uSec for example, when both the input signals are of 1, as shown in FIG. 3(E), and at this time, the edge of the projected image 4A is detected.

Here, in this embodiment, the light receiving elements 12A and 12B which constitute the sensor 12 are arranged concentrically with each other and output levels of the signals produced by the light receiving elements 12A and 12B at the sensor output terminals 14A and 14B are made equal to each other, whereby the border line between the light receiving elements 12A and 12B does not coincide with the moving direction, and the signals being uniform in output can be obtained regardless of the movement of the sensor 12 relative to the projected image 4A, so that the edge can be detected with high accuracy, with no restriction in the movement of the sensor relative to the object to be measured.

Futhermore, the light receiving elements 12A and 12B which constitute the sensor 12 are arranged concentrically with each other, whereby the area opposed to the object to be measured of the light receiving surfaces of the light receiving elements 12A and 12B can be decreased, so that the invention can be applied to a measuring instrument compact in size. Moreover, a supporting means can be simplified in construction and an effective inspecting scope of the screen can be increased in a projector.

Furthermore, the sensor 12 is compact in size, so that the invention can be applied to the edge detection for an object to be measured, which has a complicated configuration.

Additionally, in the above embodiment, the light receiving element 12B has been formed into the circular shape and the light receiving element 12A has been formed into the concentric ring surrounding the periphery of the circular light receiving element 12B and radially spaced apart therefrom, however, the present invention need not necessarily be limited to this, and any light receiving elements constituting the sensor will suffice only if the outer peripheral shapes thereof are concentric with each other.

Figure 5:
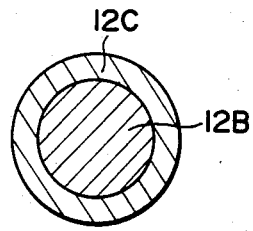
FIGS. 5 and 6 are plan views showing other embodiments of the arrangement of the light receiving elements of the sensor according to the present invention.

In consequence, as shown in FIG. 5 for example, a ring-shaped light receiving element 12C may be arranged with a circular light receiving element 12B disposed inside, with no radial space being provided therebetween.

Figure 6:
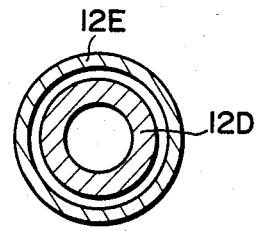

As shown in FIG. 6, the two light receiving elements may be formed of concentric ring-shaped light receiving elements 12D and 12E.

In the above embodiment, the region signal generator 18 has been constituted by the two comparators 26, 28 and the exclusive OR gate 30, however, any region signal generator may be adopted only if it can detect a rise or a fall of one of the output signals of the sensor, not being restricted by the arrangement in the embodiment.

In the above embodiment, the light receiving elements 12A and 12B have been made equal in light receiving surface to each other, whereby the levels of the output signals appearing at the sensor output terminals 14A and 14B have been equal in value to each other, however, any arrangement may be adopted only if the levels of the output signals appearing at the sensor output terminals 14A and 14B are equal in value to each other. In consequence, the output levels appearing at both sensor output terminals 14A and 14B may be made equal in value to each other with interposing between the light receiving elements 12A, 12B and the sensor output terminals 14A, 14B or without providing the amplifiers.

Further, in this embodiment, the sensor 12 has been moved relative to the projected image 4A, however, for example, the mount 3 may be moved, whereby the projected image 4A is moved relative to the sensor 12.

Furthermore, in the above embodiment, the edge of the image projected on the screen has been measured in the projector, however, the present invention need not necessarily be limited to this, and, in general, is applicable to the edge detecting devices in the optical measuring instruments, wherein the transmitted or reflected light is detected to directly or indirectly measure a dimension of the object to be measured.

In consequence, the present invention is applicable to a photo-electric length measuring instrument wherein a main scale and an index scale, which are provided with optical lattices, respectively, are moved relative to each other so as to photoelectrically measure a dimension and the like or an edge detecting device in a measuring instrument, wherein an object to be measured is scanned in paralled by a laser ray or the like so as to measure a dimension and the like of the object to be measured from a bright or a dark portion thereof.

What is claimed is:

1. An edge detecting device in an optical measuring instrument for detecting a transmitted or a reflected light to directly or indirectly measure a dimension of an object to be measured, characterized in that said edge detecting device comprises:
    a sensor including two light receiving elements disposed concentrically with each other on a plane substantially parallel to a plane of a relative movement between said object to be measured and said two light receiving elements so as to produce phase shift signals in response to a bright or a dark portion of said object to be measured during said relative movement, wherein levels of sensor output signals appearing at sensor output terminals in response to outputs of said light receiving elements become equal in value to each other each time the bright or dark portion is generated during said relative movement;
    a difference calculator connected to said sensor output terminals, for calculating a difference between said phase shift signals;
    a region signal generator making an output signal taken out of a signal processing system extending from the output side of said sensor to the input side of said difference calculator into an input signal, for outputting a signal in a specific region including a cross point region which coincides with a reference level signal of said phase shift signals; and sensing means for outputting a cross signal between an output signal from said difference calculator and a preset reference level signal while said region generator outputs said signal.

2. An edge detecting device in an optical measuring instrument as set forth in claim 1, wherein the outer peripheries of said two light receiving elements are formed into circular shapes and light receiving areas thereof are made equal to each other.

3. An edge detecting device in an optical measuring instrument as set forth in claim 1, wherein one of the light receiving elements is formed into a circular shape in cross section, the other of the light receiving elements is formed into a ring shape concentric with the one, disposed therearound and radially spaced apart therefrom, and light receiving areas thereof are made equal to each other.

4. An edge detecting device in an optical measuring instrument as set forth in claim 1, wherein said sensor includes a preamplifier disposed between one of said two light receiving elements and one of said sensor output terminals, whereby output signal levels of said two light receiving elements against received light quantities being equal to each other are made equal to each other at said sensor output terminals.

5. An edge detecting device in an optical measuring instrument as set forth in claim 2, wherein said sensor includes a preamplifier disposed between one of said two light receiving elements and one of said sensor output terminals, whereby output signal levels of said two light receiving elements against received light quantities being equal to each other are made equal to each other at said sensor output terminals.

6. An edge detecting device in an optical measuring instrument as set forth in claim 3, wherein said sensor includes a preamplifier disposed between one of said two light receiving elements and one of said sensor output terminals, whereby output signal levels of said two light receiving elements against received light quantities being equal to each other are made equal to each other at said sensor output terminals.

7. An edge detecting device in an optical easuring instrument as set forth in claim 1, wherein said region signal generator includes a window comparator for comparing one of said sensor output signals with a reference signal to produce said region signal generator output signal when the level of said one of the signals is within a predetermined range.

8. An edge detecting device in an optical measuring instrument as set forth in claim 2, wherein said region signal generator includes a window comparator for comparing one of said sensor output signals with a reference signal to produce said region signal generator output signal when the level of said one of the signals is within a predetermined range.

9. An edge detecting device in an optical measuring instrument as set forth in claim 3, wherein said region signal generator includes a window comparator for comparing one of said sensor output signals with a reference signal to produce said region signal generator output signal when the level of said one of the signals is within a predetermined range.

10. An edge detecting device in an optical measuring instrument as set forth in claim 4, wherein said region signal generator includes a window comparator for comparing one of said sensor output signals with a reference signal to produce said region signal generator output signal when the level of said one of the signals is within a predetermined range.

11. An edge detecting device in an optical measuring instrument as set forth in claim 5, wherein said region signal generator includes a window comparator for comparing one of said sensor output signals with a reference signal to produce said region signal generator output signal when the level of said one of the signals is within a predetermined range.

12. An edge detecting device in an optical measuring instrument as set forth in claim 6, wherein said region signal generator includes a window comparator for comparing one of said sensor output signals with a reference signal to produce said region signal generator output signal when the level of said one of the signals is within a predetermined range.

13. An edge detecting device in an optical measuring instrument as set forth in claim 1, wherein said region signal generator comprises:
 a first comparator for comparing one of said sensor output signals with a first reference signal to output a signal when said one of the signals is lower in value than said first reference signal;
 a second comparator for comparing said one of the signals with a second reference signal to output a signal when said one of the signals is lower in value than a second reference signal; and
 an exclusive OR gate for producing a region signal when only one of said first and said second comparators outputs a signal.

14. An edge detecting device in an optical measuring instrument as set forth in claim 2, wherein said region signal generator comprises:
 a first comparator for comparing one of said sensor output signals with a first reference signal to output a signal when said one of the signals is lower in value than said first reference signal;
 a second comparator for comparing said one of the signals with a second reference signal to output a signal when said one of the signals is lower in value than a second reference signal; and
 an exclusive OR gate for producing a region signal when only one of said first and said second comparators outputs a signal.

15. An edge detecting device in an optical measuring instrument as set forth in claim 3, wherein said region signal generator comprises:
 a first comparator for comparing one of said sensor output signals with a first reference signal to output a signal when said one of the signals is lower in value than said first reference signal;
 a second comparator for comparing said one of the signals with a second reference signal to output a signal when said one of the signals is lower in value than a second reference signal; and
 an exclusive OR gate for producing a region signal when only one of said first and said second comparators outputs a signal.

16. An edge detecting device in an optical measuring instrument as set forth in claim 4, wherein said region signal generator comprises:
 a first comparator for comparing one of said sensor output signals with a first reference signal to output a signal when said one of the signals is lower in value than said first reference signal;
 a second comparator for comparing said one of the signals with a second reference signal to output a signal when said one of the signals is lower in value than a second reference signal; and
 an exclusive OR gate for producing a region signal when only one of said first and said second comparators outputs a signal.

17. An edge detecting device in an optical measuring instrument as set forth in claim 5, wherein said region signal generator comprises:
 a first comparator for comparing one of said sensor output signals with a first reference signal to output a signal when said one of the signals is lower in value than said first reference signal;
 a second comparator for comparing said one of the signals with a second reference signal to output a signal when said one of the signals is lower in value than a second reference signal; and
 an exclusive OR gate for producing a region signal when only one of said first and said second comparators outputs a signal.

18. An edge detecting device in an optical measuring instrument as set forth in claim 6, wherein said region signal generator comprises:
 a first comparator for comparing one of said sensor output signals with a first reference signal to output a signal when said one of the signals is lower in value than said first reference signal;
 a second comparator for comparing said one of the signals with a second reference signal to output a signal when said one of the signals is lower in value than a second reference signal; and
 an exclusive OR gate for producing a region signal when only one of said first and said second comparators outputs a signal.

* * * * *